United States Patent
Guo

(10) Patent No.: US 12,120,548 B2
(45) Date of Patent: Oct. 15, 2024

(54) INFORMATION TRANSMISSION METHOD AND NETWORK DEVICE

(71) Applicant: DATANG MOBILE COMMUNICATIONS EQUIPMENT CO., LTD., Beijing (CN)

(72) Inventor: Yali Guo, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 468 days.

(21) Appl. No.: 17/288,488

(22) PCT Filed: Oct. 18, 2019

(86) PCT No.: PCT/CN2019/111835
§ 371 (c)(1),
(2) Date: Apr. 23, 2021

(87) PCT Pub. No.: WO2020/083102
PCT Pub. Date: Apr. 30, 2020

(65) Prior Publication Data
US 2021/0392539 A1    Dec. 16, 2021

(30) Foreign Application Priority Data
Oct. 25, 2018 (CN) .......................... 201811251413.1

(51) Int. Cl.
*H04W 28/02* (2009.01)
*H04M 15/00* (2006.01)
*H04W 28/22* (2009.01)

(52) U.S. Cl.
CPC ....... *H04W 28/0268* (2013.01); *H04M 15/66* (2013.01); *H04W 28/22* (2013.01)

(58) Field of Classification Search
CPC .. H04W 28/0268; H04W 28/22; H04M 15/66
(Continued)

(56) References Cited

U.S. PATENT DOCUMENTS

2017/0359749 A1   12/2017 Dao
2018/0027544 A1*   1/2018 Kimura ............... H04W 72/51
                                                     370/330
(Continued)

FOREIGN PATENT DOCUMENTS

CN    101374100 A    2/2009
CN    101969406 A    2/2011
(Continued)

OTHER PUBLICATIONS

First Office Action and search report from CN app. No. 201811251413.1, dated Jan. 27, 2021, with English translation provided by Global Dossier, all pages.
(Continued)

*Primary Examiner* — Obaidul Huq
(74) *Attorney, Agent, or Firm* — Ladas & Parry, LLP

(57) ABSTRACT

An information transmission method and a network device are provided. The method includes: obtaining a quality of service QoS parameter sent by a PCF entity, where the quality of service QoS parameter includes a QoS identifier; a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane anchor UPF.

17 Claims, 5 Drawing Sheets

(58) Field of Classification Search
USPC .......................................................... 370/229
See application file for complete search history.

(56) References Cited

U.S. PATENT DOCUMENTS

| | | | |
|---|---|---|---|
| 2018/0227866 A1 | 8/2018 | Jung et al. | |
| 2018/0376445 A1 | 12/2018 | Yoon et al. | |
| 2020/0107225 A1 | 4/2020 | Zhang et al. | |
| 2020/0107285 A1* | 4/2020 | Prakash | H04L 1/0018 |
| 2020/0112872 A1* | 4/2020 | Nimbavikar | H04L 47/805 |
| 2021/0014767 A1* | 1/2021 | Xu | H04W 72/23 |

FOREIGN PATENT DOCUMENTS

| | | | |
|---|---|---|---|
| CN | 102045787 A | 5/2011 | |
| CN | 102340535 A | 2/2012 | |
| CN | 103596285 A | 2/2014 | |
| CN | 108632904 A | 10/2018 | |
| EP | 3547769 A1 | 10/2019 | |
| WO | 2018/097599 A1 | 5/2018 | |

OTHER PUBLICATIONS

International Search Report from PCT/CN2019/111835, dated Jan. 21, 2020, with English translation from WIPO, all pages.
Written Opinion of the International Searching Authority from PCT/CN2019/111835, dated Jan. 21, 2020, with English translation from WIPO, all pages.
International Preliminary Report on Patentability from PCT/CN2019/111835, dated Apr. 27, 2021, with English translation from WIPO, all pages.
Ericsson, "[23.501] Clarification of QoS Flows with signalled characteristics", S2-171219, SA WG2 Meeting #123, Oct. 23-27, Ljubjana, all pages.
Extended European Search Report from EP app. No. 19876998.6, dated Dec. 7, 2021, all pages.

* cited by examiner

INFORMATION TRANSMISSION METHOD AND NETWORK DEVICE

CROSS-REFERENCE TO RELATED APPLICATIONS

This application is the U.S. national phase of PCT Application No. PCT/CN2019/111835 filed on Oct. 18, 2019 which claims a priority to Chinese Patent Application No. 201811251413.1 filed in China on Oct. 25, 2018, the disclosures of which are incorporated in their entireties by reference herein.

TECHNICAL FIELD

The present disclosure relates to the technical field of communication applications, and in particular to an information transmission method and a network device.

BACKGROUND

In a next generation (Next Gen) network, a user equipment (User Equipment, UE, also referred to as a terminal) performs data transmission through a packet data unit (Packet Data Unit, PDU) session, and each UE may establish multiple PDU sessions after attaching to a network. Multiple data flows with different quality of service (Quality of Service, QoS) requirements may be transmitted in each PDU session, which are called QoS flows. During the establishment of a PDU session, a session management function (Session Management Function, SMF) entity may select one or more user plane anchors (User Plane Function, UPF) for each PDU session, user data may be transmitted to a base station through a UE, and may be transmitted from the base station to the UPF and then to an external data network.

Each QoS flow has a 5G QoS identifier (5QI), which is used to represent a QoS characteristic of this QoS flow. The 5QI may have a standardized value, or a non-standardized value dynamically assigned by the network. Each standardized 5QI value corresponds to specific priority, latency requirement, and bit error rate requirement. The latency requirement represents a transmission latency from the UE to the UPF, including a requirement on a sum of a packet delivery latency over the air interface from the UE to the base station and a packet delivery latency over the infrastructure network from the base station to the UPF. For a 5QI value, the packet delivery latency over the infrastructure network is generally considered to be a certain value. For example, for a standardized 5QI value which is 1, the standard stipulates that the packet delivery latency over the infrastructure network is 20 ms; for a standardized 5QI value which is 84, the standard stipulates the packet delivery latency over the infrastructure network is 5 ms; for a standardized 5QI value which is 80, the standard stipulates that the packet delivery latency over the infrastructure network is 2 ms. The core network formulates the requirement of 5QI and sends it to the base station. The base station subtracts the packet delivery latency over the infrastructure network from the latency requirement corresponding to the 5QI to obtain requirement of the packet delivery latency over the air interface, and performs air interface resource scheduling according to the packet delivery latency over the air interface.

After the PDU session is established, the actual data transmission latency between the UPF and the base station is determined. In related technologies, a situation where the 5QI determined by a policy control function (PCF) entity based on application requirements and operator configuration or other factors is inconsistent with the real packet delivery latency over the infrastructure network may occur, which may result in network instability.

SUMMARY

The object of the present disclosure is to provide an information transmission method and a network device, to solve the problem in the related technologies that a situation where the 5QI determined by the PCF entity based on application requirements and operator configuration or other factors is inconsistent with the real packet delivery latency over the infrastructure network may occur and then network instability may be caused.

In order to achieve the above object, embodiments of the present disclosure provide an information transmission method, which is applied to a session management function (SMF) entity, including: obtaining a quality of service (QoS) parameter sent by a policy control function (PCF) entity, where the QoS parameter includes a QoS identifier; where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane function (UPF).

The QoS parameter further includes a QoS characteristic corresponding to the QoS identifier, and the QoS characteristic includes the packet delivery latency budget over the infrastructure network.

Before the obtaining the QoS parameter sent by the PCF entity, the information transmission method further includes: sending, to the PCF entity, information about the real packet delivery latency over the infrastructure network between the base station and the UPF, after selecting the UPF for a packet data unit (PDU) session.

After the obtaining the QoS parameter sent by the PCF entity, the information transmission method further includes: sending QoS control information of a QoS flow to the base station through an access and mobility management function (AMF); where the QoS control information includes the QoS identifier, a packet delivery latency budget corresponding to the QoS identifier, and the packet delivery latency budget over the infrastructure network corresponding to the QoS identifier; or, the QoS control information includes the QoS identifier and a packet delivery latency over an air interface corresponding to the QoS identifier.

After the obtaining the QoS parameter sent by the PCF entity, the information transmission method further includes: obtaining a policy control and charging (PCC) rule sent by the PCF entity; and in a case that a packet delivery latency budget over an infrastructure network corresponding to a QoS identifier in the PCC rule is less than the real packet delivery latency over the infrastructure network, inserting a new UPF for the PDU session, and transmitting a data flow of the PDU session according to the new UPF; where a real packet delivery latency over the infrastructure network between the new UPF and the base station is less than or equal to the packet delivery latency budget over the infrastructure network corresponding to the QoS identifier in the PCC rule.

The information about the real packet delivery latency over the infrastructure network includes at least one of: the real packet delivery latency over the infrastructure network between the base station and the UPF, a UPF identifier, or a data network access identifier (DNAI).

In order to achieve the above object, embodiments of the present disclosure also provide an information transmission method, which is applied to a policy control function (PCF) entity, including: sending a quality of service (QoS) parameter to a session management function (SMF) entity, where the QoS parameter includes a QoS identifier; where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane function (UPF).

Before the sending the QoS parameter to the SMF entity, the information transmission method further includes: obtaining information about the real packet delivery latency over the infrastructure network between the base station and the UPF, where the information about the real packet delivery latency over the infrastructure network is sent by the SMF entity.

The sending the QoS parameter to the SMF entity includes: sending the QoS identifier to the SMF entity, in a case that a value of the QoS identifier assigned according to the real packet delivery latency over the infrastructure network is a standardized value; in a case that the value of the QoS identifier assigned according to the real packet delivery latency over the infrastructure network is a non-standardized value, assigning a QoS characteristic, and sending the QoS identifier and the QoS characteristic to the SMF entity; where the QoS characteristic includes the packet delivery latency budget over the infrastructure network, and in a case that the value of the QoS identifier is the standardized value, the QoS identifier corresponds to the packet delivery latency budget over the infrastructure network.

After the sending the QoS parameter to the SMF entity, the information transmission method further includes: in a case that a new service request is received and if a packet delivery latency budget over an infrastructure network corresponding to the new service request is less than a latency corresponding to the information about the real packet delivery latency over the infrastructure network, rejecting the service request, or, sending a PCC rule corresponding to the new service request to the SMF, where the PCC rule includes the packet delivery latency budget over the infrastructure network corresponding to the new service request.

In order to achieve the above object, embodiments of the present disclosure also provide an information transmission method, which is applied to a base station, including: obtaining QoS control information of a QoS flow sent by a session management function (SMF) entity; and determining a packet delivery latency over an air interface according to the QoS control information, and performing resource scheduling according to the packet delivery latency over the air interface; where the QoS control information includes a QoS identifier, a packet delivery latency budget corresponding to the QoS identifier, and a packet delivery latency budget over an infrastructure network corresponding to the QoS identifier; or, the QoS control information includes a QoS identifier and the packet delivery latency over the air interface corresponding to the QoS identifier.

The QoS control information includes the QoS identifier, the packet delivery latency budget corresponding to the QoS identifier, and the packet delivery latency budget over the infrastructure network corresponding to the QoS identifier; where the determining the packet delivery latency over the air interface according to the QoS control information includes: subtracting the packet delivery latency budget over the infrastructure network corresponding to the QoS identifier from the packet delivery latency budget corresponding to the QoS identifier to obtain the packet delivery latency over the air interface.

In order to achieve the above object, embodiments of the present disclosure also provide a network device. The network device is a session management function (SMF) entity, including: a transceiver, a memory, a processor, and a program stored in the memory and executable on the processor, and the processor is configured to implement the following step when executing the program: obtaining a quality of service (QoS) parameter sent by a policy control function (PCF) entity, where the QoS parameter includes a QoS identifier; where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane function (UPF).

The QoS parameter further includes a QoS characteristic corresponding to the QoS identifier, and the QoS characteristic includes the packet delivery latency budget over the infrastructure network.

The processor is configured to implement the following step when executing the program: sending, to the PCF entity, information about the real packet delivery latency over the infrastructure network between the base station and the UPF, after selecting the UPF for a packet data unit (PDU) session.

The processor is configured to implement the following step when executing the program: sending QoS control information of a QoS flow to the base station through an access and mobility management function (AMF); where the QoS control information includes the QoS identifier, a packet delivery latency budget corresponding to the QoS identifier, and the packet delivery latency budget over the infrastructure network corresponding to the QoS identifier; or, the QoS control information includes the QoS identifier and a packet delivery latency over an air interface corresponding to the QoS identifier.

The processor is configured to implement the following steps when executing the program: obtaining a policy control and charging (PCC) rule sent by the PCF entity; and in a case that a packet delivery latency budget over an infrastructure network corresponding to a QoS identifier in the PCC rule is less than the real packet delivery latency over the infrastructure network, inserting a new UPF for the PDU session, and transmitting a data flow of the PDU session according to the new UPF; where a real packet delivery latency over the infrastructure network between the new UPF and the base station is less than or equal to the packet delivery latency budget over the infrastructure network corresponding to the QoS identifier in the PCC rule.

The information about the real packet delivery latency over the infrastructure network includes at least one of: the real packet delivery latency over the infrastructure network between the base station and the UPF, a UPF identifier, or a data network access identifier (DNAI).

In order to achieve the above object, embodiments of the present disclosure also provide a computer readable storage medium, having a program stored thereon, where the program, when being executed by a processor, performs the steps of the information transmission method as described above.

In order to achieve the above object, embodiments of the present disclosure also provide a network device. The network device is a policy control function (PCF) entity, including: a transceiver, a memory, a processor, and a program stored in the memory and executable on the processor, and the processor is configured to implement the following step when executing the program: sending, via the transceiver, a quality of service (QoS) parameter to a session management function (SMF) entity, where the QoS parameter includes a QoS identifier; where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane function (UPF).

The processor is configured to implement the following step when executing the program: obtaining information about the real packet delivery latency over the infrastructure network between the base station and the UPF, where the information about the real packet delivery latency over the infrastructure network is sent by the SMF entity.

The processor is configured to implement the following steps when executing the program: sending the QoS identifier to the SMF entity, in a case that a value of the QoS identifier assigned according to the real packet delivery latency over the infrastructure network is a standardized value; in a case that the value of the QoS identifier assigned according to the real packet delivery latency over the infrastructure network is a non-standardized value, assigning a QoS characteristic, and sending the QoS identifier and the QoS characteristic to the SMF entity; where the QoS characteristic includes the packet delivery latency budget over the infrastructure network, and in a case that the value of the QoS identifier is the standardized value, the QoS identifier corresponds to the packet delivery latency budget over the infrastructure network.

The processor is configured to implement the following step when executing the program: in a case that a new service request is received and if a packet delivery latency budget over an infrastructure network corresponding to the new service request is less than a latency corresponding to the information about the real packet delivery latency over the infrastructure network, rejecting the service request, or, sending a PCC rule corresponding to the new service request to the SMF, where the PCC rule includes the packet delivery latency budget over the infrastructure network corresponding to the new service request.

In order to achieve the above object, embodiments of the present disclosure also provide a computer readable storage medium, having a program stored thereon, where the program, when being executed by a processor, performs the steps of the information transmission method as described above.

In order to achieve the above object, embodiments of the present disclosure also provide a network device. The network device is a base station and includes a transceiver, a memory, a processor, and a program stored in the memory and executable on the processor, and the processor is configured to implement the following steps when executing the program: obtaining QoS control information of a QoS flow sent by a session management function (SMF) entity; and determining a packet delivery latency over an air interface according to the QoS control information, and performing resource scheduling according to the packet delivery latency over the air interface; where the QoS control information includes a QoS identifier, a packet delivery latency budget corresponding to the QoS identifier, and a packet delivery latency budget over an infrastructure network corresponding to the QoS identifier; or, the QoS control information includes a QoS identifier and the packet delivery latency over the air interface corresponding to the QoS identifier.

The QoS control information includes the QoS identifier, the packet delivery latency budget corresponding to the QoS identifier, and the packet delivery latency budget over the infrastructure network corresponding to the QoS identifier; where the processor is configured to implement the following step when executing the program: subtracting the packet delivery latency budget over the infrastructure network corresponding to the QoS identifier from the packet delivery latency budget corresponding to the QoS identifier to obtain the packet delivery latency over the air interface.

In order to achieve the above object, embodiments of the present disclosure also provide a computer readable storage medium, having a program stored thereon, where the program, when being executed by a processor, performs the steps of the information transmission method applied to the base station side as described above.

In order to achieve the above object, embodiments of the present disclosure also provide a network device. The network device is a session management function (SMF) entity and includes: a first obtaining module, configured to obtain a quality of service (QoS) parameter sent by a policy control function (PCF) entity, where the QoS parameter includes a QoS identifier; where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane function (UPF).

The QoS parameter further includes a QoS characteristic corresponding to the QoS identifier, and the QoS characteristic includes the packet delivery latency budget over the infrastructure network.

In order to achieve the above object, embodiments of the present disclosure also provide a network device. The network device is a policy control function (PCF) entity and includes: a first sending module, configured to send a quality of service (QoS) parameter to a session management function (SMF) entity, where the QoS parameter includes a QoS identifier; where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane function (UPF).

The network device also includes: a second obtaining module, configured to obtain information about the real packet delivery latency over the infrastructure network between the base station and the UPF, where the information about the real packet delivery latency over the infrastructure network is sent by the SMF entity.

In order to achieve the above object, embodiments of the present disclosure also provide a network device. The network device is a base station and includes: a third obtaining module, configured to obtain QoS control information of a QoS flow sent by a session management function (SMF) entity; and a determining module, configured to determine a packet delivery latency over an air interface according to the QoS control information, and perform resource scheduling according to the packet delivery latency over the air interface; where the QoS control information includes a QoS identifier, a packet delivery latency budget corresponding to the QoS identifier, and a packet delivery latency budget over an infrastructure network corresponding to the QoS identifier; or, the QoS control information includes a QoS identifier and the packet delivery latency over the air interface corresponding to the QoS identifier.

The QoS control information includes the QoS identifier, the packet delivery latency budget corresponding to the QoS identifier, and the packet delivery latency budget over the infrastructure network corresponding to the QoS identifier; where the determining module is configured to subtract the packet delivery latency budget over the infrastructure network corresponding to the QoS identifier from the packet delivery latency budget corresponding to the QoS identifier to obtain the packet delivery latency over the air interface.

The embodiments of the present disclosure have the following beneficial effects.

In the above technical solutions of the embodiments of the present disclosure, the SMF obtains the quality of service (QoS) parameter sent by the PCF entity, and the packet delivery latency budget over the infrastructure network corresponding to the QoS identifier in the QoS parameter is greater than or equal to the real packet delivery latency over the infrastructure network, so that the packet delivery latency budget over the infrastructure network corresponding to the QoS identifier assigned by the PCF can satisfy the real packet delivery latency over the infrastructure network, which increases stability of the network.

DETAILED DESCRIPTION

Exemplary embodiments of the present disclosure are described in more detail with reference to the accompanying drawings hereinafter. Although the drawings show exemplary embodiments of the present disclosure, it should be understood that the present disclosure may be implemented in various forms and should not be limited by the embodiments set forth herein. On the contrary, these embodiments are provided to enable a more thorough understanding of the present disclosure and to fully convey the scope of the present disclosure to those skilled in the art.

Terms such as "having" and "including" or any other variants thereof in the specification and claims of the present disclosure are intended to cover non-exclusive inclusion. For example, a process, method, system, or product including a series of steps or units is not limited to the steps or units that are clearly listed and may include other steps or units that are not clearly listed or are inherent to the process, method, product, or device. The term "and/or" used in the specification and the claims indicates at least one of connected objects.

Examples provided in the following descriptions are not intended to limit the scope, applicability, or configuration described in the claims. Functions and arrangements of discussed elements may be changed without departing from the spirit and scope of the present disclosure. Various examples may be omitted or replaced properly, or various procedures or components may be added. For example, the described method may be performed in an order different from the described order, and steps may be added, omitted, or combined. In addition, features described with reference to some examples may be combined in other examples.

In order to enable those skilled in the art to better understand the embodiments of the present disclosure, a network system to which the embodiments of the present disclosure may be applied is described as follows.

Figure 1:
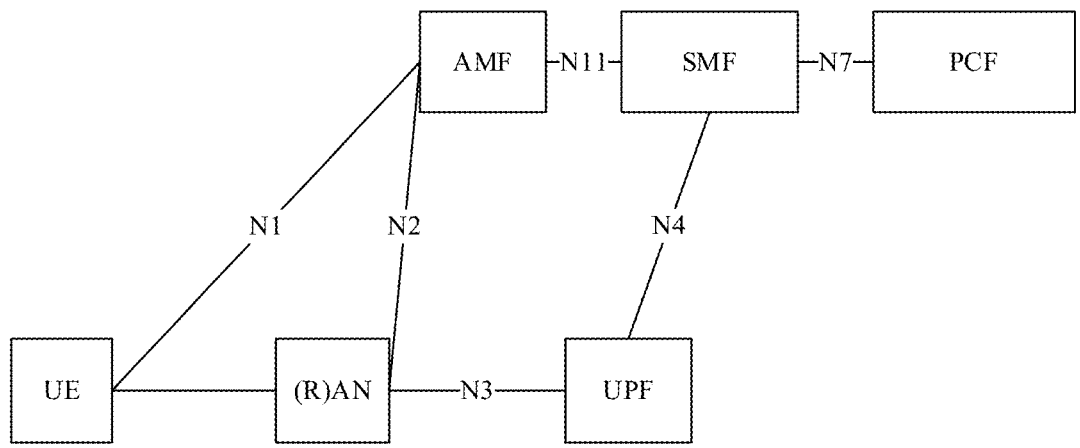
FIG. 1 is a structural diagram of a network system applicable to embodiments of the present disclosure.

As shown in FIG. 1, the Next Gen network architecture is as follows. UPF is a user plane anchor; AMF and SMF are control plane network nodes; AMF is responsible for mobility management and is connected to a UE and an access network (Access Network, AN), and the access network may be specifically a base station; and PCF is responsible for policy control. SMF is a session management function, which is connected to the UPF and is responsible for managing a PDU session established between the UE and the network. When a PDU session is established, the SMF selects UPF(s) for this session.

Multiple data flows with different QoS requirements may be transmitted in each PDU session, which are called QoS flows. During the establishment of a PDU session, the SMF may select one or more UPFs for each PDU session, user data may be transmitted to the base station through the UE, and may be transmitted from the base station to the UPF and then to the external data network.

Each QoS flow has a 5QI, which is used to represent a QoS characteristic of this QoS flow. The 5QI may have a standardized value, or a non-standardized value dynamically assigned by the network.

The standardized values of 5QI and the QoS characteristics represented by the values are shown in Table 1.

TABLE 1

| 5QI value | Priority | Latency requirement | Bit error rate requirement |
|---|---|---|---|
| 1 | 20 | 100 ms | $10^{-2}$ |
| 2 | 40 | 150 ms | $10^{-3}$ |
| 3 | 30 | 50 ms | $10^{-3}$ |
| 4 | 50 | 300 ms | $10^{-6}$ |
| 65 | 7 | 75 ms | $10^{-2}$ |
| 66 | 20 | 100 ms | $10^{-2}$ |
| 67 | 15 | 100 ms | $10^{-3}$ |
| 75 | 25 | 50 ms | $10^{-2}$ |
| 5 | 10 | 100 ms | $10^{-6}$ |
| 6 | 60 | 300 ms | $10^{-6}$ |
| 7 | 70 | 100 ms | $10^{-3}$ |
| 8 | 80 | 300 ms | $10^{-6}$ |

TABLE 1-continued

| 5QI value | Priority | Latency requirement | Bit error rate requirement |
|---|---|---|---|
| 9 | 90 | | |
| 69 | 5 | 60 ms | $10^{-6}$ |
| 70 | 55 | 200 ms | $10^{-6}$ |
| 79 | 65 | 50 ms | $10^{-2}$ |
| 80 | 68 | 10 ms | $10^{-6}$ |
| 82 | 19 | 10 ms | $10^{-4}$ |
| 83 | 22 | 10 ms | $10^{-4}$ |
| 84 | 24 | 30 ms | $10^{-5}$ |
| 85 | 21 | 5 ms | $10^{-5}$ |

It is assumed that the real packet delivery latency over the infrastructure network between the UPF of a PDU session and the base station is 20 ms. The policy control function (PCF) entity does not know the real packet delivery latency over the infrastructure network between the UPF selected for the PDU session by the SMF and the base station accessed by the UE. For example, if the 5QI determined by the PCF according to application requirements and operator configuration or other factors is a standardized 5QI and has a value of 84, the base station subtracts, a packet delivery latency over the infrastructure network of 5 ms that is specified in the standard, from a transmission latency requirement of 30 ms, according to standardized requirement, and obtains requirement of a packet delivery latency over an air interface of 25 ms, and the base station schedules data packets of this QoS flow according to the latency requirement of 25 ms, then actual transmission latencies of a large quantity of data packets may exceed the transmission latency requirement of the 5QI since the actual data transmission latency between the base station and the UPF is 20 ms.

Figure 2:
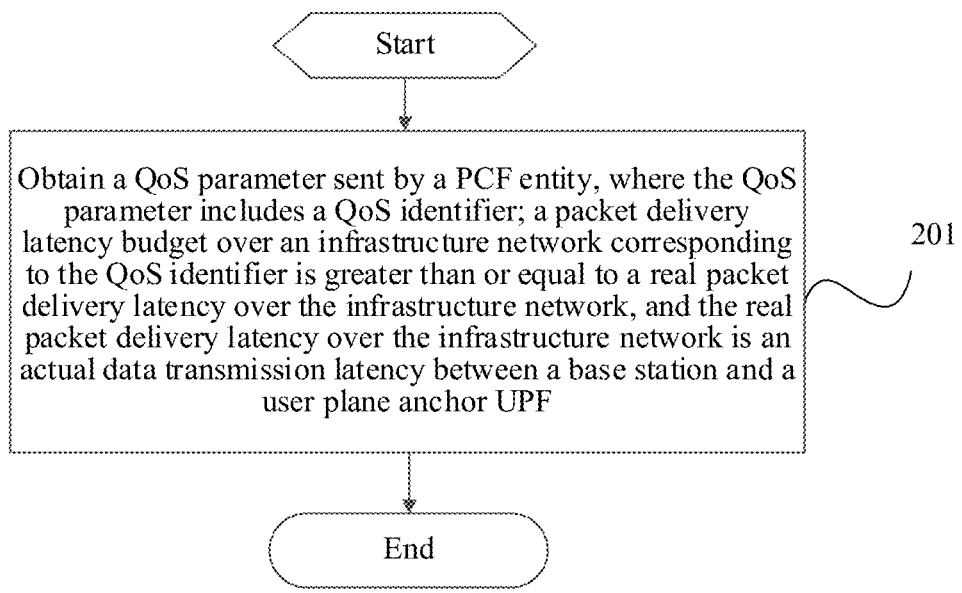
FIG. 2 is a first schematic flowchart of an information transmission method according to embodiments of the present disclosure.

The embodiments of the present disclosure provide an information transmission method, to avoid the occurrence of the situation where that the transmission latency requirement of 5QI assigned for the QoS flow is inconsistent with the actual data transmission latency between the UPF of the PDU session and the base station. FIG. 2 is a schematic flowchart of an information transmission method according to embodiments of the present disclosure. As shown in FIG. 2, embodiments of the present disclosure provide an information transmission method, which is applied to a session management function (SMF) entity and includes the following step.

Step 201 includes: obtaining a quality of service (QoS) parameter sent by a policy control function (PCF) entity, where the QoS parameter includes a QoS identifier;
where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane anchor (User Plane Function, UPF).

The QoS identifier may be a 5QI.

The real packet delivery latency over the infrastructure network may be reported to the PCF by the SMF after selecting the user plane anchor UPF for the packet data unit (PDU) session.

In the information transmission method of the embodiments of the present disclosure, the SMF obtains the quality of service (QoS) parameter sent by the PCF entity, and the packet delivery latency budget over the infrastructure network corresponding to the QoS identifier in the QoS parameter is greater than or equal to the real packet delivery latency over the infrastructure network, so that the packet delivery latency budget over the infrastructure network corresponding to the QoS identifier assigned by the PCF can satisfy the real packet delivery latency over the infrastructure network, which increases stability of the network.

Further, the quality of service (QoS) parameter further includes: a QoS characteristic corresponding to the QoS identifier, and the QoS characteristic includes the packet delivery latency budget over the infrastructure network.

In the embodiments of the present disclosure, in a case that the value corresponding to the QoS identifier is a standardized value, the QoS identifier corresponds to the packet delivery latency budget over the infrastructure network. In a case that the value corresponding to the QoS identifier is a non-standardized value, the quality of service (QoS) parameter further includes the QoS characteristic corresponding to the QoS identifier, and the QoS characteristic includes the packet delivery latency budget over the infrastructure network.

Further, before the obtaining the QoS parameter sent by the PCF entity, the information transmission method further includes: sending, to the PCF entity, information about the real packet delivery latency over the infrastructure network between the base station and the UPF, after selecting the user plane anchor UPF for a packet data unit (PDU) session.

The information about the real packet delivery latency over the infrastructure network includes at least one of: the real packet delivery latency over the infrastructure network between the base station and the UPF, a UPF identifier, or a data network access identifier (DNAI).

In the process of establishing a PDU session, after the SMF selects a UPF for this PDU session, the SMF may report, to the PCT, information (which may be the real packet delivery latency over the infrastructure network between the base station and the UPF, or a UPF identifier, or a data network access identification DNAI, or other information) about the real packet delivery latency over the infrastructure network between the base station and the UPF; and the PCF may assign a QoS identifier (5QI) in a PCC rule according to the information about the real packet delivery latency over the infrastructure network obtained from the SMF, to ensure that the packet delivery latency budget over the infrastructure network corresponding to the QoS identifier in the PCC rule to be consistent with the real packet delivery latency over the infrastructure network between the base station and the UPF of the PDU session.

After the SMF selects the UPF for the PDU session, it sends the information about the real packet delivery latency over the infrastructure network to the PCF entity, to enable the PCF entity to know the actual transmission information of the infrastructure network, so that the packet delivery latency budget over the infrastructure network corresponding to the assigned QoS identifier in the QoS parameter is greater than or equal to the real packet delivery latency over the infrastructure network, which increases the stability of the network.

Further, after the obtaining the QoS parameter sent by the PCF entity, the information transmission method further includes: sending QoS control information of a QoS flow to the base station through an access and mobility management function (AMF);
where the QoS control information includes the QoS identifier, a packet delivery latency budget corresponding to the QoS identifier, and the packet delivery latency budget over the infrastructure network corresponding to the QoS identifier; or, the QoS control information includes the QoS identifier and a packet delivery latency over an air interface corresponding to the QoS identifier.

In the embodiments of the present disclosure, the SMF provides the QoS control information of the QoS flow to the base station through transparent transmission of the AMF. Specifically, the QoS control information includes the QoS identifier, such as 5QI. In a case that the value corresponding to the QoS identifier is a non-standardized value, the QoS control information also includes: the packet delivery latency budget corresponding to the QoS identifier, and the packet delivery latency budget over the infrastructure network corresponding to the QoS identifier, or, the QoS control information also includes: the packet delivery latency over the air interface corresponding to the QoS identifier.

It should be noted that the packet delivery latency budget over the infrastructure network corresponding to the QoS identifier in the QoS control information may be obtained by the SMF from the PCF, or may be the real packet delivery latency over the infrastructure network determined by the SMF itself.

Further, after the obtaining the QoS parameter sent by the PCF entity, the information transmission method further includes:
 obtaining a policy control and charging (PCC) rule sent by the PCF entity; and
 in a case that a packet delivery latency budget over an infrastructure network corresponding to a QoS identifier in the PCC rule is less than the real packet delivery latency over the infrastructure network, inserting a new UPF for the PDU session, and transmitting a data flow of the PDU session according to the new UPF;
 where a real packet delivery latency over the infrastructure network between the new UPF and the base station is less than or equal to the packet delivery latency budget over the infrastructure network corresponding to the QoS identifier in the PCC rule.

In the embodiments of the present disclosure, when the SMF performs UPF selection or UPF reselection for a PDU session, the PCF has obtained the information about the real packet delivery latency over the infrastructure network from the SMF, and then in a case that a new service occurs, the PCF receives the new service request from an application entity AF. If a packet delivery latency budget over an infrastructure network corresponding to a QoS identifier in the service request does not match the real packet delivery latency over the infrastructure network of the corresponding PDU session, the PCF may reject the AF request. Or, the PCF sends a PCC rule to the SMF according to the service request, and the SMF determines that the real packet delivery latency over the infrastructure network of the current PDU session cannot meet the 5QI according to a QoS identifier (5QI) in the PCC rule, and inserts a new UPF for the PDU session to perform routing of the corresponding data flow.

The information transmission method in the embodiments of the present disclosure is described hereinafter in conjunction with specific embodiments.

First Example

Figure 3:
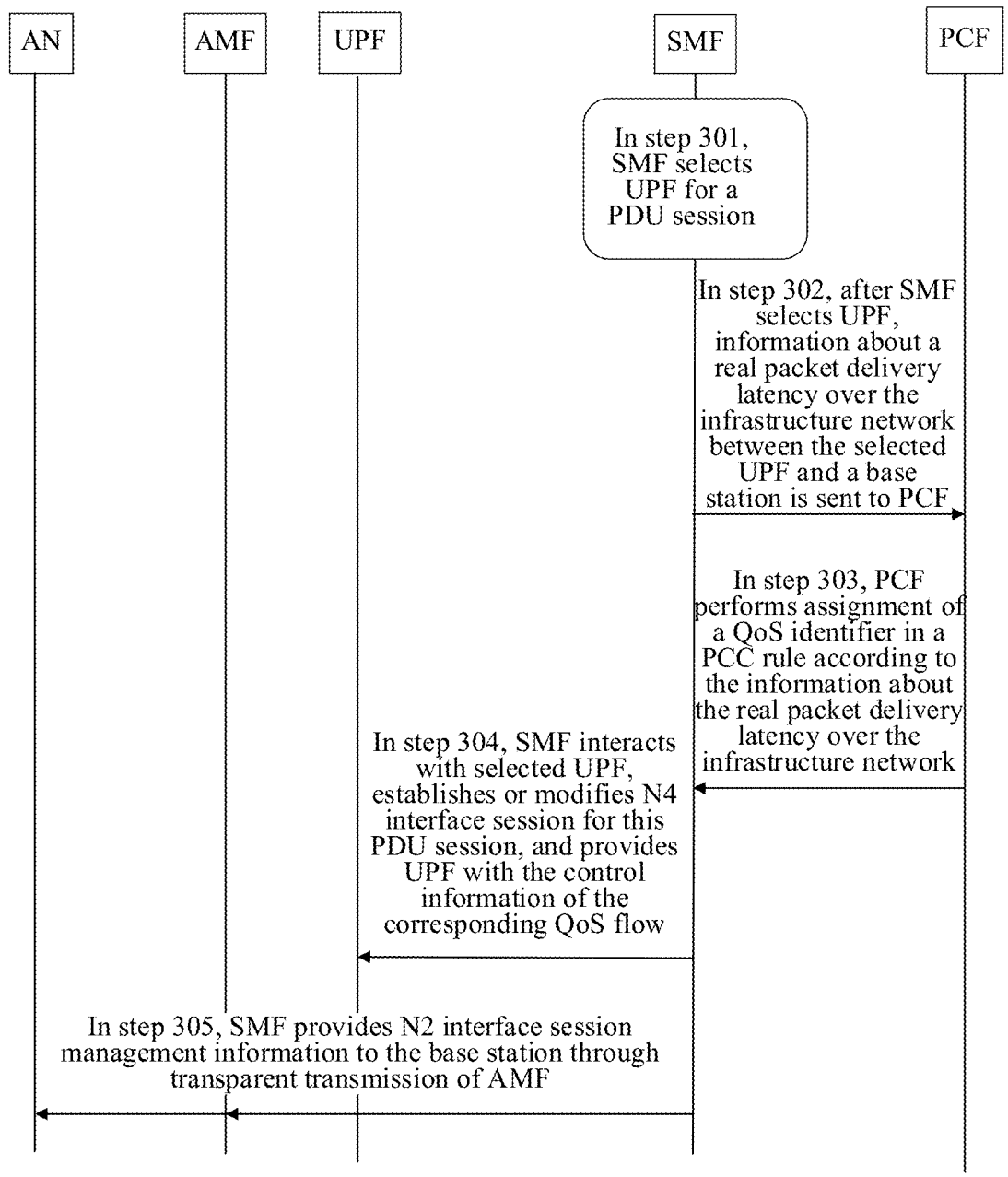
FIG. 3 is a first schematic diagram of interaction in an information transmission method according to embodiments of the present disclosure.

As shown in FIG. 3, the information transmission method includes the following steps.

In step 301, an SMF selects a UPF for a PDU session.

This step may occur in a process of establishment of a PDU session, or in a process of reselecting a UPF or inserting a new UPF for a PDU session by the SMF after successful establishment of the PDU session.

In step 302, after the SMF selects the UPF, information about a real packet delivery latency over the infrastructure network between the selected UPF and a base station is sent to a PCF.

The information about the real packet delivery latency over the infrastructure network may be a value or a range of the real packet delivery latency over the infrastructure network between the base station and the UPF, or may be a UPF identifier or a data network access identifier (DNAI), or other information, which can enable the PCF to infer the real packet delivery latency over the infrastructure network.

In step 303, the PCF performs assignment of a QoS identifier in a PCC rule according to the information about the real packet delivery latency over the infrastructure network.

The QoS identifier in the PCC rule is assigned according to the information about the real packet delivery latency over the infrastructure network, to ensure the packet delivery latency budget over the infrastructure network corresponding to the QoS identifier in the PCC rule to be consistent with the real packet delivery latency over the infrastructure network between the base station and the UPF of the PDU session, that is, the packet delivery latency budget over the infrastructure network corresponding to the QoS identifier is greater than or equal to the real packet delivery latency over the infrastructure network.

For example, if the real packet delivery latency over the infrastructure network between the base station and the UPF in the PDU session is 10 ms, the PCF may not assign a standardized 5QI which has a value of 84. This is because: the standardized 5QI which has a value of 84 specifies in the standard that a packet delivery latency budget from the UE to the UPF is 30 ms, where a packet delivery latency budget over an infrastructure network is 5 ms; the base station calculates requirement of a packet delivery latency over an air interface as 25 ms according to the standardized requirement, and the base station may schedule data packets of this QoS flow according to this latency requirement of 25 ms; as the actual data transmission latency between the base station and the UPF is 10 ms, actual transmission latencies between the UE and the UPF of a large quantity of data packets may reach 25 ms+10 ms=35 ms, exceeding the packet delivery latency budget of the 5QI which is 30 ms. If the PCF assigns a standardized 5QI which has a value of 1, it is feasible. This is because: the standardized 5QI which has a value of 1 stipulates in the standard that a packet delivery latency budget form the UE to the UPF is 100 ms, where a packet delivery latency budget over an infrastructure network is 20 ms; the base station calculates requirement of a packet delivery latency over an air interface as 80 ms according to the standardized requirement, and the base station may schedule data packets of this QoS flow according to this latency requirement of 80 ms; as the actual data transmission latency between the base station and the UPF is 10 ms, an actual transmission latency of a data packet between the UE and the UPF may reach up to 80 ms+10 ms=90 ms, not exceeding the transmission latency requirement of the 5QI which is 100 ms.

If the 5QI assigned by the PCF has a non-standardized value, when the PCF provides the QoS characteristic corresponding to the non-standardized 5QI value to the SMF, it may provide the packet delivery latency budget over the infrastructure network corresponding to the 5QI, where the packet delivery latency budget over the infrastructure network is consistent with the real packet delivery latency over the infrastructure network, between the base station and the UPF, of the PDU session. For example, the packet delivery latency budget over the infrastructure network as provided may has a value not less than the real packet delivery latency over the infrastructure network.

In step 304, the SMF interacts with the selected UPF, establishes or modifies the N4 interface session for this PDU session, and provides the UPF with the control information of the corresponding QoS flow.

In step 305, the SMF provides N2 interface session management information to the base station through the transparent transmission of the AMF.

The N2 interface session management information includes the QoS control information of the corresponding QoS flow. The QoS control information includes information about 5QI. If the 5QI has a non-standardized 5QI value, the QoS control information also includes the packet delivery latency budget and the packet delivery latency budget over the infrastructure network which are corresponding to the 5QI. The packet delivery latency budget over the infrastructure network may be obtained from the PCF by the SMF in step 3, or it may be the real packet delivery latency over the infrastructure network between the base station and the UPF which is determined by the SMF. Or, the packet delivery latency over the air interface corresponding to this 5QI may be directly included in the QoS control information by the SMF.

In the embodiments of the present disclosure, the base station performs corresponding resource scheduling according to the obtained QoS control information. The base station needs to calculate the packet delivery latency budget over the air interface based on the received 5QI. If the 5QI has a standardized 5QI value, the base station obtains the packet delivery latency budget over the air interface by subtracting, the packet delivery latency budget over the infrastructure network specified in the standard, from the packet delivery latency budget specified in the standard corresponding to this 5QI value. If 5QI has a non-standardized 5QI value, the base station obtains the packet delivery latency budget over the air interface by subtracting, the packet delivery latency budget over the infrastructure network received from SMF, from the packet delivery latency budget received from SMF, or, the base station directly obtains the packet delivery latency budget over the air interface corresponding to this 5QI from the QoS control information sent by the SMF.

In the information transmission method of the embodiments of the present disclosure, after the SMF selects the UPF for the PDU session, it sends the information about the real packet delivery latency over the infrastructure network to the PCF entity, to enable the PCF entity to know the actual transmission information of the infrastructure network, so that the packet delivery latency budget over the infrastructure network corresponding to the assigned QoS identifier in the QoS parameter is greater than or equal to the real packet delivery latency over the infrastructure network, which increases the stability of the network.

Second Example

Figure 4:
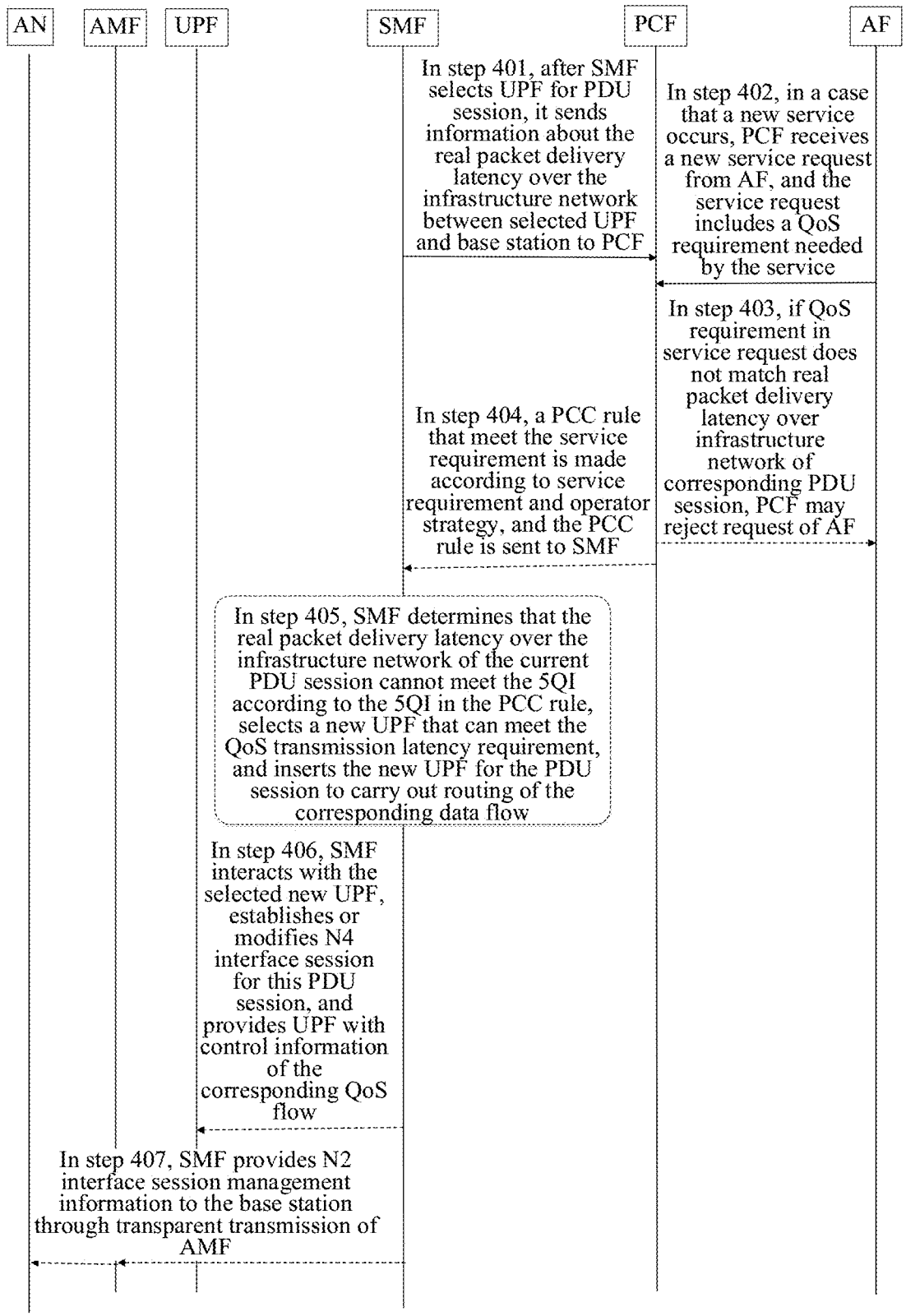
FIG. 4 is a second schematic diagram of interaction in an information transmission method according to embodiments of the present disclosure.

As shown in FIG. 4, the information transmission method includes the following steps.

In step 401, after the SMF selects a UPF for a PDU session, it sends the information about the real packet delivery latency over the infrastructure network between the selected UPF and the base station to the PCF.

The information about the real packet delivery latency over the infrastructure network may be a value or a range of the real packet delivery latency over the infrastructure network between the base station and the UPF, or may be a UPF identifier or a data network access identifier (DNAI), or other information, which can enable the PCF to infer the real packet delivery latency over the infrastructure network.

In step 402, in a case that a new service occurs, the PCF receives a new service request from the AF, and the service request includes a QoS requirement needed by the service.

In step 403, if the QoS requirement in the service request does not match the real packet delivery latency over the infrastructure network of the corresponding PDU session, the PCF may reject the request of the AF.

For example, if the QoS requirement in the service request requires the transmission latency to be 5 ms, and the real packet delivery latency over the infrastructure network between the base station and the UPF of the PDU session obtained by the PCF from the SMF is 10 ms, then transmission meeting the QoS requirement of the service cannot be implemented through the current UPF.

In step 404, a PCC rule that meet the service requirement is made according to service requirement and operator strategy, and the PCC rule is sent to the SMF.

The PCC rule includes a corresponding 5QI, and the 5QI in the PCC rule does not conform to the current real packet delivery latency over the infrastructure network between the base station and the UPF. For example, although the SMF has reported that the real packet delivery latency over the infrastructure network, between the base station and the UPF, of the current PDU session is 10 ms, the PCF still sends a 5QI having a standardized value of 85, and the 5QI having the standardized value of 85 specifies in the standard that the requirement of transmission from UE to UPF is 5 ms, where the packet delivery latency over the infrastructure network is 1 ms; or the PCF sends a 5QI having a non-standardized value. In a case that the PCF provides to the SMF the QoS characteristic corresponding to the non-standardized 5QI value, it may also provide the packet delivery latency budget over the infrastructure network corresponding to the 5QI. The packet delivery latency budget over the infrastructure network does not match the current real packet delivery latency over the infrastructure network between the base station and the UPF. For example, the packet delivery latency budget over the infrastructure network as provided has a value less than the current real packet delivery latency over the infrastructure network.

It should be noted that in the embodiments of the present disclosure, only one of step 403 and step 404 is selected in the specific execution process.

In step 405, the SMF determines that the real packet delivery latency over the infrastructure network of the current PDU session cannot meet the 5QI according to the 5QI in the PCC rule, selects a new UPF that can meet the QoS transmission latency requirement, and inserts the new UPF for the PDU session to carry out routing of the corresponding data flow.

In step 406, the SMF interacts with the selected new UPF, establishes or modifies the N4 interface session for this PDU session, and provides the UPF with the control information of the corresponding QoS flow.

In step 407, the SMF provides N2 interface session management information to the base station through the transparent transmission of the AMF.

The N2 interface session management information includes the QoS control information of the corresponding QoS flow. The QoS control information includes information about 5QI. If the 5QI has a non-standardized 5QI value, the QoS control information also includes the packet delivery latency budget and the packet delivery latency budget over the infrastructure network corresponding to the 5QI. The packet delivery latency budget over the infrastructure network may be obtained from the PCF by the SMF in step 3, or it may be the real packet delivery latency over the infrastructure network between the base station and the UPF which is determined by the SMF, or, the packet delivery latency over the air interface corresponding to this 5QI may be directly included in the QoS control information by the SMF.

In the embodiments of the present disclosure, the base station performs corresponding resource scheduling according to the obtained QoS control information. The base station needs to calculate the packet delivery latency budget over the air interface based on the received 5QI. If the 5QI has a standardized 5QI value, the base station obtains the packet delivery latency budget over the air interface by subtracting, the packet delivery latency budget over the infrastructure network specified in the standard, from the packet delivery latency budget specified in the standard corresponding to this 5QI value. If 5QI has a non-standardized 5QI value, the base station obtains the packet delivery latency budget over the air interface by subtracting, the packet delivery latency budget over the infrastructure network received from SMF, from the packet delivery latency budget received from SMF, or, the base station directly obtains, the packet delivery latency budget over the air interface corresponding to this 5QI, from the QoS control information sent by the SMF.

In information transmission method of the embodiments of the present disclosure, when the SMF performs UPF selection or UPF reselection for a PDU session, the PCF has obtained the information about the real packet delivery latency over the infrastructure network from the SMF, and then in a case that a new service occurs, the PCF receives the new service request from an application entity AF. If a packet delivery latency budget over an infrastructure network corresponding to a QoS identifier in the service request does not match the real packet delivery latency over the infrastructure network of the corresponding PDU session, the PCF may reject the request of the AF. Or, the PCF sends a PCC rule to the SMF according to the service request, and the SMF determines that the real packet delivery latency over the infrastructure network of the current PDU session cannot meet the 5QI according to a QoS identifier (5QI) in the PCC rule, and inserts a new UPF for the PDU session to perform routing of the corresponding data flow.

Figure 5:
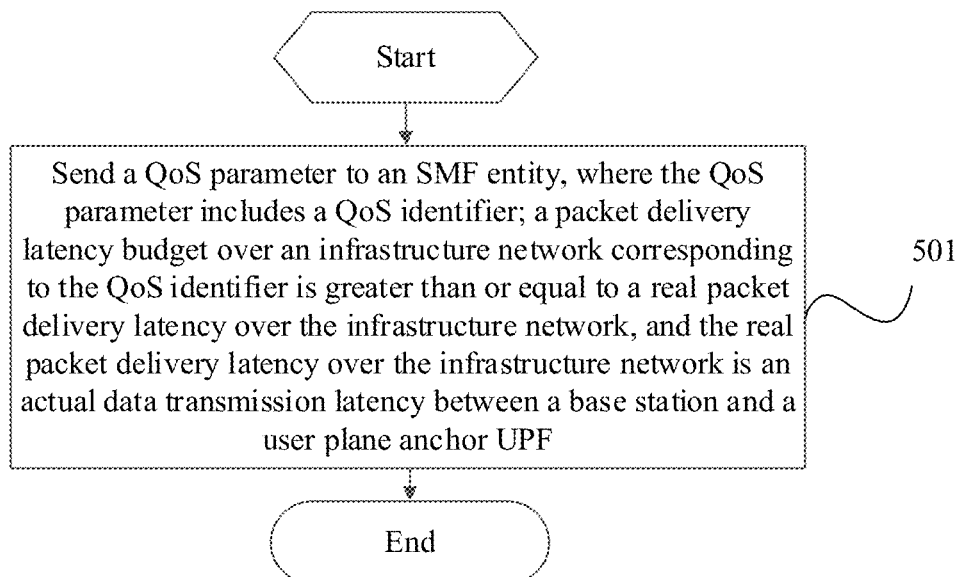
FIG. 5 is a second schematic flowchart of an information transmission method according to embodiments of the present disclosure.

As shown in FIG. 5, embodiments of the present disclosure also provide an information transmission method, which is applied to a policy control function (PCF) entity, including the following steps.

Step 501 includes: sending a quality of service (QoS) parameter to a session management function (SMF) entity, where the QoS parameter includes a QoS identifier;
   where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane anchor (User Plane Function, UPF).

The QoS identifier may specifically be a 5QI.

The real packet delivery latency over the infrastructure network may be reported to the PCF by the SMF after selecting the user plane anchor UPF for a packet data unit (PDU) session.

In the information transmission method of the embodiments of the present disclosure, the PCF sends the QoS parameter including the QoS identifier to the SMF, and the packet delivery latency budget over the infrastructure network corresponding to the QoS identifier in the QoS parameter is greater than or equal to the real packet delivery latency over the infrastructure network, so that packet delivery latency budget over the infrastructure network corresponding to the QoS identifier assigned by the PCF can meet the real packet delivery latency over the infrastructure network, which increases the stability of the network.

Further, before the sending the QoS parameter to the SMF entity, the information transmission method further includes: obtaining information about the real packet delivery latency over the infrastructure network between the base station and the UPF, where the information about the real packet delivery latency over the infrastructure network is sent by the SMF entity.

The information about the real packet delivery latency over the infrastructure network includes at least one of: the real packet delivery latency over the infrastructure network between the base station and the UPF, a UPF identifier, or a data network access identifier (DNAI).

In the process of establishing a PDU session, after the SMF selects a UPF for this PDU session, the SMF may report, to the PCT, information (which may be the real packet delivery latency over the infrastructure network between the base station and the UPF, or a UPF identifier, or a data network access identification DNAI, or other information) about the real packet delivery latency over the infrastructure network between the base station and the UPF; and the PCF may assign a QoS identifier (5QI) in a PCC rule according to the information about the real packet delivery latency over the infrastructure network obtained from the SMF, to ensure that the packet delivery latency budget over the infrastructure network corresponding to the QoS identifier in the PCC rule to be consistent with the real packet delivery latency over the infrastructure network between the base station and the UPF of the PDU session.

After the SMF selects the UPF for the PDU session, it sends the information about the real packet delivery latency over the infrastructure network to the PCF entity, to enable the PCF entity to know the actual transmission information of the infrastructure network, so that the packet delivery latency budget over the infrastructure network corresponding to the assigned QoS identifier in the QoS parameter is greater than or equal to the real packet delivery latency over the infrastructure network, which increases the stability of the network.

Further, the sending the QoS parameter to the SMF entity includes:
   sending the QoS identifier to the SMF entity, in a case that a value of the QoS identifier assigned according to the real packet delivery latency over the infrastructure network is a standardized value;
   in a case that the value of the QoS identifier assigned according to the real packet delivery latency over the infrastructure network is a non-standardized value, assigning a QoS characteristic, and sending the QoS identifier and the QoS characteristic to the SMF entity;
   where the QoS characteristic includes the packet delivery latency budget over the infrastructure network, and in a case that the value of the QoS identifier is the standardized value, the QoS identifier corresponds to the packet delivery latency budget over the infrastructure network.

Further, after the sending the QoS parameter to the SMF entity, the information transmission method further includes:

in a case that a new service request is received and if a packet delivery latency budget over an infrastructure network corresponding to the new service request is less than a latency corresponding to the information about the real packet delivery latency over the infrastructure network, rejecting the service request, or, sending a PCC rule corresponding to the new service request to the SMF, where the PCC rule includes the packet delivery latency budget over the infrastructure network corresponding to the new service request.

In the embodiments of the present disclosure, when the SMF performs UPF selection or UPF reselection for a PDU session, the PCF has obtained the information about the real packet delivery latency over the infrastructure network from the SMF, and then in a case that a new service occurs, the PCF receives the new service request from an application entity AF. If a packet delivery latency budget over an infrastructure network corresponding to a QoS identifier in the service request is not consistent with the real packet delivery latency over the infrastructure network of the corresponding PDU session, the PCF may reject the AF request. Or, the PCF sends a PCC rule to the SMF according to the service request, and the SMF determines that the real packet delivery latency over the infrastructure network of the current PDU session cannot meet the 5QI according to a QoS identifier (5QI) in the PCC rule, and inserts a new UPF for the PDU session to perform routing of the corresponding data flow.

In the information transmission method of the embodiments of the present disclosure, the PCF sends the QoS parameter including the QoS identifier to the SMF, and the packet delivery latency budget over the infrastructure network corresponding to the QoS identifier in the QoS parameter is greater than or equal to the real packet delivery latency over the infrastructure network, so that packet delivery latency budget over the infrastructure network corresponding to the QoS identifier assigned by the PCF can meet the real packet delivery latency over the infrastructure network, which increases the stability of the network.

Figure 6:
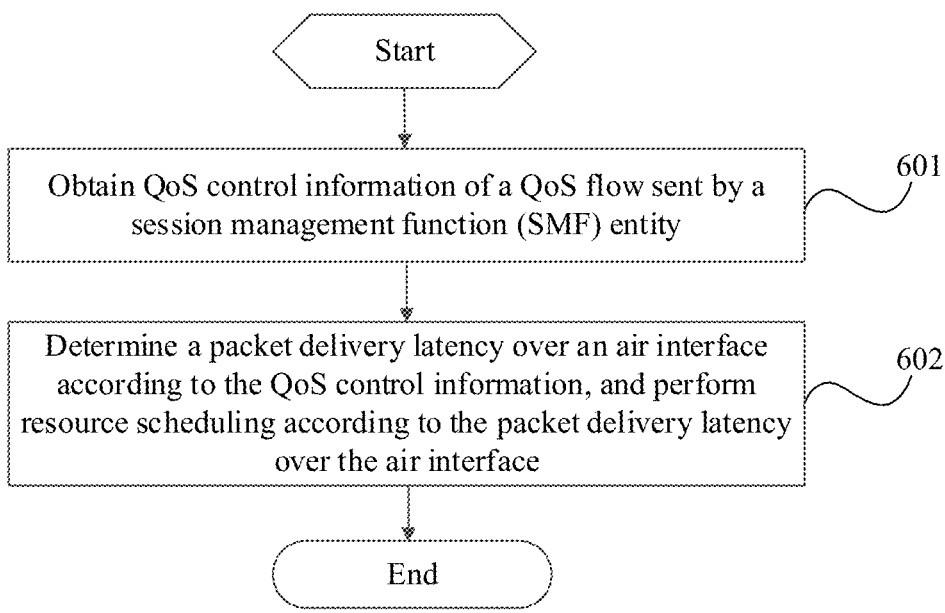
FIG. 6 is a third schematic flowchart of an information transmission method according to embodiments of the present disclosure.

As shown in FIG. 6, embodiments of the present disclosure also provide an information transmission method applied to a base station, including the following steps.

Step 601 includes: obtaining QoS control information of a QoS flow sent by a session management function (SMF) entity.

The QoS control information includes a QoS identifier, a packet delivery latency budget corresponding to the QoS identifier, and a packet delivery latency budget over an infrastructure network corresponding to the QoS identifier.

Or, the QoS control information includes a QoS identifier and the packet delivery latency over the air interface corresponding to the QoS identifier.

In the embodiments of the present disclosure, the SMF provides the QoS control information of the QoS flow to the base station through transparent transmission of the AMF. Specifically, the QoS control information includes the QoS identifier, such as 5QI. In a case that the value corresponding to the QoS identifier is a non-standardized value, the QoS control information also includes: the packet delivery latency budget corresponding to the QoS identifier, and the packet delivery latency budget over the infrastructure network corresponding to the QoS identifier, or, the QoS control information also includes: the packet delivery latency over the air interface corresponding to the QoS identifier.

It should be noted that the packet delivery latency budget over the infrastructure network corresponding to the QoS identifier in the QoS control information may be obtained by the SMF from the PCF, or may be the real packet delivery latency over the infrastructure network determined by the SMF itself.

Step 602 includes: determining a packet delivery latency over an air interface according to the QoS control information, and performing resource scheduling according to the packet delivery latency over the air interface.

In a case that the QoS control information includes the QoS identifier, the packet delivery latency budget corresponding to the QoS identifier, and the packet delivery latency budget over the infrastructure network corresponding to the QoS identifier, the determining the packet delivery latency over the air interface according to the QoS control information includes: subtracting the packet delivery latency budget over the infrastructure network corresponding to the QoS identifier from the packet delivery latency budget corresponding to the QoS identifier to obtain the packet delivery latency over the air interface.

In the embodiments of the present disclosure, the base station performs corresponding resource scheduling according to the obtained QoS control information. The base station needs to calculate the packet delivery latency budget over the air interface based on the received 5QI. If the 5QI has a standardized 5QI value, the base station obtains the packet delivery latency budget over the air interface by subtracting, the packet delivery latency budget over the infrastructure network specified in the standard, from the packet delivery latency budget specified in the standard corresponding to this 5QI value. If 5QI has a non-standardized 5QI value, the base station obtains the packet delivery latency budget over the air interface by subtracting, the packet delivery latency budget over the infrastructure network received from SMF, from the packet delivery latency budget received from SMF, or, the base station directly obtains the packet delivery latency budget over the air interface corresponding to this 5QI from the QoS control information sent by the SMF.

Figure 7:
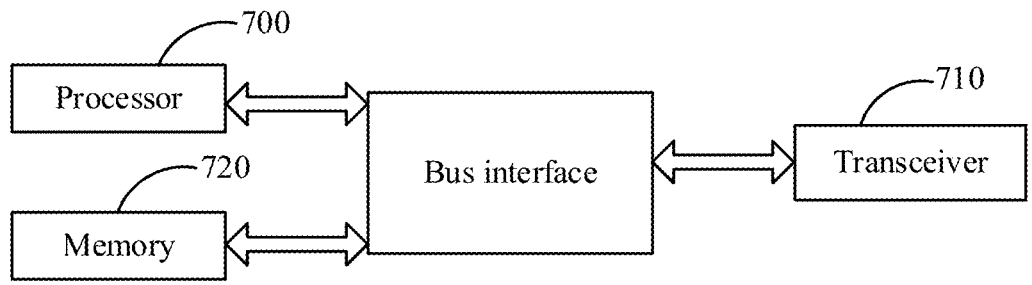
FIG. 7 is a block diagram of a network device according to embodiments of the present disclosure.

As shown in FIG. 7, embodiments of the present disclosure also provides a network device, which is specifically a session management function (SMF) entity, including a memory 720, a processor 700, a transceiver 710, a bus interface, and a computer program stored on the memory 720 and executable on the processor 700, where the processor 700 is configured to read the program in the memory 720 to execute the following process:

obtaining a quality of service (QoS) parameter sent by a policy control function (PCF) entity, where the QoS parameter includes a QoS identifier;

where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane anchor (User Plane Function, UPF).

In FIG. 7, a bus architecture may include any quantity of interconnected buses and bridges. Various circuits including one or more processors represented by the processor 700 and a memory represented by the memory 720 are coupled. The bus architecture may further couple various other circuits together, such as a periphery component, a voltage stabilizer and a power management circuit, which are known in the art and are not further described herein. A bus interface provides an interface. The transceiver 710 may be multiple elements, i.e., including a transmitter and a receiver, providing a unit for communicating with various other devices on a transmission medium. The processor 700 is in charge of managing the bus architecture and common processes. The memory 720 may be configured to store data used by the processor 700 in performing operations.

Optionally, the QoS parameter further includes: a QoS characteristic corresponding to the QoS identifier, and the QoS characteristic includes the packet delivery latency budget over the infrastructure network.

Optionally, the processor 700 may also implement the following step when executing the computer program: sending, to the PCF entity, information about the real packet delivery latency over the infrastructure network between the base station and the UPF, after selecting the UPF for a packet data unit (PDU) session.

Optionally, the processor 700 may also implement the following step when executing the computer program: sending QoS control information of a QoS flow to the base station through an access and mobility management function (AMF);
where the QoS control information includes the QoS identifier, a packet delivery latency budget corresponding to the QoS identifier, and the packet delivery latency budget over the infrastructure network corresponding to the QoS identifier; or, the QoS control information includes the QoS identifier and a packet delivery latency over an air interface corresponding to the QoS identifier.

Optionally, the processor 700 may also implement the following steps when executing the computer program:
obtaining a policy control and charging (PCC) rule sent by the PCF entity; and
in a case that a packet delivery latency budget over an infrastructure network corresponding to a QoS identifier in the PCC rule is less than the real packet delivery latency over the infrastructure network, inserting a new UPF for the PDU session, and transmitting a data flow of the PDU session according to the new UPF;
where a real packet delivery latency over the infrastructure network between the new UPF and the base station is less than or equal to the packet delivery latency budget over the infrastructure network corresponding to the QoS identifier in the PCC rule.

Optionally, the information about the real packet delivery latency over the infrastructure network includes at least one of: the real packet delivery latency over the infrastructure network between the base station and the UPF, a UPF identifier, or a data network access identifier (DNAI).

In the network device of the embodiments of the present disclosure, the quality of service (QoS) parameter sent by the PCF entity is received, and the packet delivery latency budget over the infrastructure network corresponding to the QoS identifier in the QoS parameter is greater than or equal to the real packet delivery latency over the infrastructure network, so that the packet delivery latency budget over the infrastructure network corresponding to the QoS identifier assigned by the PCF can satisfy the real packet delivery latency over the infrastructure network, which increases stability of the network.

In some embodiments of the present disclosure, a computer readable storage medium is also provided, on which a computer program is stored, and the program, when being executed by a processor, performs the following step:

obtaining a quality of service (QoS) parameter sent by a policy control function (PCF) entity, where the QoS parameter includes a QoS identifier;
where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane function (UPF).

When the program is executed by the processor, all the implementation manners in the above method embodiments applied to the SMF side can be realized. To avoid repetition, details are not further described herein.

Figure 8:
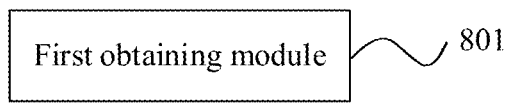
FIG. 8 is a first schematic diagram of modules of a network device according to embodiments of the present disclosure.

As shown in FIG. 8, embodiments of the present disclosure also provide a network device, where the network device is a session management function (SMF) entity, and includes:
a first obtaining module 801, configured to obtain a quality of service (QoS) parameter sent by a policy control function (PCF) entity, where the QoS parameter includes a QoS identifier;
where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane function (UPF).

In the network device of the embodiments of the present disclosure, the QoS parameter further includes: a QoS characteristic corresponding to the QoS identifier, and the QoS characteristic includes the packet delivery latency budget over the infrastructure network.

The network device of the embodiments of the present disclosure further includes:
a second sending module, configured to: send, to the PCF entity, information about the real packet delivery latency over the infrastructure network between the base station and the UPF, after selecting the UPF for a packet data unit (PDU) session and before obtaining the QoS parameter sent by the PCF entity.

The network device of the embodiments of the present disclosure further includes:
a third sending module, configured to send QoS control information of a QoS flow to the base station through an access and mobility management function (AMF), after obtaining the QoS parameter sent by the PCF entity.
where the QoS control information includes the QoS identifier, a packet delivery latency budget corresponding to the QoS identifier, and the packet delivery latency budget over the infrastructure network corresponding to the QoS identifier; or, the QoS control information includes the QoS identifier and a packet delivery latency over an air interface corresponding to the QoS identifier.

The network device of the embodiments of the present disclosure further includes:
a fourth obtaining module, configured to obtain a policy control and charging (PCC) rule sent by the PCF entity after obtaining the quality of service (QoS) parameter sent by the PCF entity; and
a first processing module, configured to: in a case that a packet delivery latency budget over an infrastructure network corresponding to a QoS identifier in the PCC rule is less than the real packet delivery latency over the infrastructure network, insert a new UPF for the PDU session, and transmit a data flow of the PDU session according to the new UPF;

where a real packet delivery latency over the infrastructure network between the new UPF and the base station is less than or equal to the packet delivery latency budget over the infrastructure network corresponding to the QoS identifier in the PCC rule.

In the network device of the embodiments of the present disclosure, the information about the real packet delivery latency over the infrastructure network includes at least one of: the real packet delivery latency over the infrastructure network between the base station and the UPF, a UPF identifier, or a data network access identifier (DNAI).

In the network device of the embodiments of the present disclosure, the quality of service (QoS) parameter sent by the PCF entity is obtained, and the packet delivery latency budget over the infrastructure network corresponding to the QoS identifier in the QoS parameter is greater than or equal to the real packet delivery latency over the infrastructure network, so that the packet delivery latency budget over the infrastructure network corresponding to the QoS identifier assigned by the PCF can satisfy the real packet delivery latency over the infrastructure network, which increases stability of the network.

Embodiments of the present disclosure also provide a network device, which is specifically a policy control function (PCF) entity, including a memory, a processor, a transceiver, a bus interface, and a computer program stored in the memory and executable on the processor. The processor is configured to read the program in the memory to execute the following process:

sending, via the transceiver, a quality of service (QoS) parameter to a session management function (SMF) entity, where the QoS parameter includes a QoS identifier;

where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane function (UPF).

The block diagram of the PCF entity is the same as the block diagram of the SMF entity shown in FIG. 7, which is not further described herein.

Optionally, the processor may also implement the following step when executing the computer program:

obtaining information about the real packet delivery latency over the infrastructure network between the base station and the UPF, where the information about the real packet delivery latency over the infrastructure network is sent by the SMF entity.

Optionally, the processor may also implement the following steps when executing the computer program:

sending the QoS identifier to the SMF entity, in a case that a value of the QoS identifier assigned according to the real packet delivery latency over the infrastructure network is a standardized value;

in a case that the value of the QoS identifier assigned according to the real packet delivery latency over the infrastructure network is a non-standardized value, assigning a QoS characteristic, and sending the QoS identifier and the QoS characteristic to the SMF entity;

where the QoS characteristic includes the packet delivery latency budget for the infrastructure network, and in a case that the value of the QoS identifier is the standardized value, the QoS identifier corresponds to the packet delivery latency budget over the infrastructure network.

Optionally, the processor may also implement the following step when executing the computer program:

in a case that a new service request is received and if a packet delivery latency budget over an infrastructure network corresponding to the new service request is less than a latency corresponding to the information about the real packet delivery latency over the infrastructure network, rejecting the service request, or, sending a PCC rule corresponding to the new service request to the SMF, where the PCC rule includes the packet delivery latency budget over the infrastructure network corresponding to the new service request.

In the network device of the embodiments of the present disclosure, the QoS parameter including the QoS identifier is sent to the SMF, and the packet delivery latency budget over the infrastructure network corresponding to the QoS identifier in the QoS parameter is greater than or equal to the real packet delivery latency over the infrastructure network, so that packet delivery latency budget over the infrastructure network corresponding to the QoS identifier assigned by the PCF can meet the real packet delivery latency over the infrastructure network, which increases the stability of the network.

In some embodiments of the present disclosure, a computer readable storage medium is also provided, on which a computer program is stored, and the program, when being executed by a processor, performs the following step:

sending a quality of service (QoS) parameter to a session management function (SMF) entity, where the QoS parameter includes a QoS identifier;

where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane anchor (User Plane Function, UPF).

When the program is executed by the processor, all the implementation manners in the above method embodiments applied to the PCF side can be realized. To avoid repetition, details are not further described herein.

Figure 9:
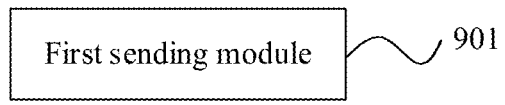
FIG. 9 is a second schematic diagram of modules of a network device according to embodiments of the present disclosure.

As shown in FIG. 9, embodiments of the present disclosure also provide a network device, where the network device is a policy control function (PCF) entity and includes:

a first sending module 901, configured to send a quality of service (QoS) parameter to a session management function (SMF) entity, where the QoS parameter includes a QoS identifier;

where a packet delivery latency budget over an infrastructure network corresponding to the QoS identifier is greater than or equal to a real packet delivery latency over the infrastructure network, and the real packet delivery latency over the infrastructure network is an actual data transmission latency between a base station and a user plane anchor (User Plane Function, UPF).

The network device of the embodiments of the present disclosure further includes:

a second obtaining module, configured to obtain information about the real packet delivery latency over the infrastructure network between the base station and the UPF, where the information about the real packet delivery latency over the infrastructure network is sent by the SMF entity.

In the network device of the embodiments of the present disclosure, the first sending module includes:
- a first sending submodule, is configured to send the QoS identifier to the SMF entity, in a case that a value of the QoS identifier assigned according to the real packet delivery latency over the infrastructure network is a standardized value;
- a second sending submodule, configured to: in a case that the value of the QoS identifier assigned according to the real packet delivery latency over the infrastructure network is a non-standardized value, assign a QoS characteristic, and send the QoS identifier and the QoS characteristic to the SMF entity;
- where the QoS characteristic includes the packet delivery latency budget over the infrastructure network, and in a case that the value of the QoS identifier is the standardized value, the QoS identifier corresponds to the packet delivery latency budget over the infrastructure network.

The network device of the embodiments of the present disclosure further includes:
- a second processing module, configured to: after sending the QoS parameter to the SMF entity, in a case that a new service request is received and if a packet delivery latency budget over an infrastructure network corresponding to the new service request is less than a latency corresponding to the information about the real packet delivery latency over the infrastructure network, reject the service request, or, send a PCC rule corresponding to the new service request to the SMF, where the PCC rule includes the packet delivery latency budget over the infrastructure network corresponding to the new service request.

In the network device of the embodiments of the present disclosure, the QoS parameter including the QoS identifier is sent to the SMF, and the packet delivery latency budget over the infrastructure network corresponding to the QoS identifier in the QoS parameter is greater than or equal to the real packet delivery latency over the infrastructure network, so that packet delivery latency budget over the infrastructure network corresponding to the QoS identifier assigned by the PCF can meet the real packet delivery latency over the infrastructure network, which increases the stability of the network.

Embodiments of the present disclosure also provide a network device, which is specifically a base station, and includes a memory, a processor, a transceiver, a bus interface, and a computer program stored in the memory and executable on the processor. The processor is configured to read the program in the memory to execute the following process:
- obtaining QoS control information of a QoS flow sent by a session management function (SMF) entity; and
- determining a packet delivery latency over an air interface according to the QoS control information, and performing resource scheduling according to the packet delivery latency over the air interface;
- where the QoS control information includes a QoS identifier, a packet delivery latency budget corresponding to the QoS identifier, and a packet delivery latency budget over an infrastructure network corresponding to the QoS identifier; or, the QoS control information includes a QoS identifier and the packet delivery latency over the air interface corresponding to the QoS identifier.

The block diagram of the base station is the same as the block diagram of the SMF entity shown in FIG. 7, which is not further described herein.

Optionally, the QoS control information includes the QoS identifier, the packet delivery latency budget corresponding to the QoS identifier, and the packet delivery latency budget over the infrastructure network corresponding to the QoS identifier;
- the processor may also implement the following step when executing the computer program:
- subtracting the packet delivery latency budget over the infrastructure network corresponding to the QoS identifier from the packet delivery latency budget corresponding to the QoS identifier to obtain the packet delivery latency over the air interface.

In the network device of the embodiments of the present disclosure, corresponding resource scheduling is performed according to the obtained QoS control information. The base station needs to calculate the packet delivery latency budget over the air interface based on the received 5QI. If the 5QI has a standardized 5QI value, the base station obtains the packet delivery latency budget over the air interface by subtracting, the packet delivery latency budget over the infrastructure network specified in the standard, from the packet delivery latency budget specified in the standard corresponding to this 5QI value. If 5QI has a non-standardized 5QI value, the base station obtains the packet delivery latency budget over the air interface by subtracting, the packet delivery latency budget over the infrastructure network received from SMF, from the packet delivery latency budget received from SMF, or, the base station directly obtains the packet delivery latency budget over the air interface corresponding to this 5QI from the QoS control information sent by the SMF.

In some embodiments of the present disclosure, a computer readable storage medium is also provided, on which a computer program is stored, and the program, when being executed by a processor, performs the following steps:
- obtaining QoS control information of a QoS flow sent by a session management function (SMF) entity; and
- determining a packet delivery latency over an air interface according to the QoS control information, and performing resource scheduling according to the packet delivery latency over the air interface;
- where the QoS control information includes a QoS identifier, a packet delivery latency budget corresponding to the QoS identifier, and a packet delivery latency budget over an infrastructure network corresponding to the QoS identifier; or, the QoS control information includes a QoS identifier and the packet delivery latency over the air interface corresponding to the QoS identifier.

When the program is executed by the processor, all the implementation manners in the above method embodiments applied to the base station side can be realized. In order to avoid repetition, details are not further described herein.

Figure 10:
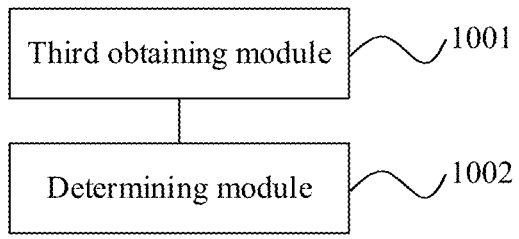
FIG. 10 is a third schematic diagram of modules of a network device according to embodiments of the present disclosure.

As shown in FIG. 10, embodiments of the present disclosure also provide a network device, where the network device is a base station and includes:
- a third obtaining module 1001, configured to obtain QoS control information of a QoS flow sent by a session management function (SMF) entity; and
- a determining module 1002, configured to determine a packet delivery latency over an air interface according to the QoS control information, and perform resource scheduling according to the packet delivery latency over the air interface;
- where the QoS control information includes a QoS identifier, a packet delivery latency budget corresponding to the QoS identifier, and a packet delivery latency budget over an infrastructure network corresponding to the QoS identifier; or, the QoS control information includes a QoS identifier and the packet delivery latency over the air interface corresponding to the QoS identifier.

In the network device of the embodiments of the present disclosure, the QoS control information includes the QoS identifier, the packet delivery latency budget corresponding to the QoS identifier, and the packet delivery latency budget over the infrastructure network corresponding to the QoS identifier;

the determining module is configured to subtract the packet delivery latency budget over the infrastructure network corresponding to the QoS identifier from the packet delivery latency budget corresponding to the QoS identifier to obtain the packet delivery latency over the air interface.

In the network device of the embodiments of the present disclosure, corresponding resource scheduling is performed according to the obtained QoS control information. The base station needs to calculate the packet delivery latency budget over the air interface based on the received 5QI. If the 5QI has a standardized 5QI value, the base station obtains the packet delivery latency budget over the air interface by subtracting, the packet delivery latency budget over the infrastructure network specified in the standard, from the packet delivery latency budget specified in the standard corresponding to this 5QI value. If 5QI has a non-standardized 5QI value, the base station obtains the packet delivery latency budget over the air interface by subtracting, the packet delivery latency budget over the infrastructure network received from SMF, from the packet delivery latency budget received from SMF, or, the base station directly obtains, the packet delivery latency budget over the air interface corresponding to this 5QI, from the QoS control information sent by the SMF.

In the various embodiments of the present disclosure, it should be understood that sizes of the sequence numbers of the processes described above are not meant to imply an order of execution, and the order of execution of the processes needs to be determined by their functions and inherent logic, which should not be construed as limiting the implementations of the embodiments of the present disclosure in any way.

Optional embodiments of the present disclosure are described in the above. It should be noted that those skilled in the art may make various improvements and modifications without departing from the principles described in the present disclosure, and the various improvements and modifications fall within the protection scope of the present disclosure.

What is claimed is:

1. An information transmission method, applied to a session management function (SMF) entity, comprising:
   obtaining, by the SMF entity, a quality of service (QOS) parameter sent by a policy control function (PCF) entity, wherein the QoS parameter comprises a QoS identifier;
   wherein a packet delivery latency budget over an infrastructure network corresponding to the QoS identifier is greater than or equal to a real packet delivery latency over the infrastructure network, and the real packet delivery latency over the infrastructure network is an real data transmission latency between a base station and a user plane function (UPF);
   wherein before the obtaining the QoS parameter sent by the PCF entity, the information transmission method further comprises: sending, to the PCF entity, information about the real packet delivery latency over the infrastructure network between the base station and the UPF, after selecting the UPF for a packet data unit (PDU) session.

2. The information transmission method according to claim 1, wherein the QOS parameter further comprises a QoS characteristic corresponding to the QoS identifier, and the QoS characteristic comprises the packet delivery latency budget over the infrastructure network.

3. The information transmission method according to claim 1, wherein after the obtaining the QoS parameter sent by the PCF entity, the information transmission method further comprises: sending QoS control information of a QoS flow to the base station through an access and mobility management function (AMF);
   wherein the QoS control information comprises the QoS identifier, a packet delivery latency budget corresponding to the QoS identifier, and the packet delivery latency budget over the infrastructure network corresponding to the QoS identifier; or, the QoS control information comprises the QoS identifier and a packet delivery latency over an air interface corresponding to the QoS identifier.

4. The information transmission method according to claim 1, wherein after the obtaining the QoS parameter sent by the PCF entity, the information transmission method further comprises:
   obtaining a policy control and charging (PCC) rule sent by the PCF entity; and
   in a case that a packet delivery latency budget over an infrastructure network corresponding to a QoS identifier in the PCC rule is less than the real packet delivery latency over the infrastructure network, inserting a new UPF for the PDU session, and transmitting a data flow of the PDU session according to the new UPF;
   wherein a real packet delivery latency over the infrastructure network between the new UPF and the base station is less than or equal to the packet delivery latency budget over the infrastructure network corresponding to the QoS identifier in the PCC rule.

5. The information transmission method according to claim 1, wherein the information about the real packet delivery latency over the infrastructure network comprises at least one of: the real packet delivery latency over the infrastructure network between the base station and the UPF, a UPF identifier, or a data network access identifier (DNAI).

6. A network device, wherein the network device is a session management function (SMF) entity and comprises: a transceiver, a memory, a processor, and a program stored in the memory and executable on the processor, and the processor is configured to implement the steps of the information transmission method according to claim 1 when executing the program.

7. The network device according to claim 6, wherein the processor is configured to implement the following step when executing the program: sending QoS control information of a QoS flow to the base station through an access and mobility management function (AMF);
   wherein the QoS control information comprises the QoS identifier, a packet delivery latency budget corresponding to the QoS identifier, and the packet delivery latency budget over the infrastructure network corresponding to the QoS identifier; or, the QoS control information comprises the QoS identifier and a packet delivery latency over an air interface corresponding to the QoS identifier.

8. The network device according to claim 6, wherein the processor is configured to implement the following steps when executing the program:
obtaining a policy control and charging (PCC) rule sent by the PCF entity; and
in a case that a packet delivery latency budget over an infrastructure network corresponding to a QoS identifier in the PCC rule is less than the real packet delivery latency over the infrastructure network, inserting a new UPF for the PDU session, and transmitting a data flow of the PDU session according to the new UPF;
wherein a real packet delivery latency over the infrastructure network between the new UPF and the base station is less than or equal to the packet delivery latency budget over the infrastructure network corresponding to the QoS identifier in the PCC rule.

9. An information transmission method, applied to a policy control function (PCF) entity, comprising:
sending, by the PCF entity, a quality of service (QOS) parameter to a session management function (SMF) entity, wherein the QoS parameter comprises a QoS identifier;
wherein a packet delivery latency budget over an infrastructure network corresponding to the QoS identifier is greater than or equal to a real packet delivery latency over the infrastructure network, and the real packet delivery latency over the infrastructure network is an real data transmission latency between a base station and a user plane function (UPF);
wherein before the sending the QoS parameter to the SMF entity, the information transmission method further comprises: obtaining information about the real packet delivery latency over the infrastructure network between the base station and the UPF, wherein the information about the real packet delivery latency over the infrastructure network is sent by the SMF entity.

10. The information transmission method according to claim 9, wherein the sending the QoS parameter to the SMF entity comprises:
sending the QoS identifier to the SMF entity, in a case that a value of the QoS identifier assigned according to the real packet delivery latency over the infrastructure network is a standardized value;
in a case that the value of the QoS identifier assigned according to the real packet delivery latency over the infrastructure network is a non-standardized value, assigning a QoS characteristic, and sending the QoS identifier and the QoS characteristic to the SMF entity;
wherein the QoS characteristic comprises the packet delivery latency budget over the infrastructure network, and in a case that the value of the QoS identifier is the standardized value, the QoS identifier corresponds to the packet delivery latency budget over the infrastructure network.

11. The information transmission method according to claim 9, wherein after the sending the QoS parameter to the SMF entity, the information transmission method further comprises:
in a case that a new service request is received and if a packet delivery latency budget over an infrastructure network corresponding to the new service request is less than a latency corresponding to the information about the real packet delivery latency over the infrastructure network, rejecting the service request, or, sending a PCC rule corresponding to the new service request to the SMF, wherein the PCC rule comprises the packet delivery latency budget over the infrastructure network corresponding to the new service request.

12. A network device, wherein the network device is a policy control function (PCF) entity and comprises: a transceiver, a memory, a processor, and a program stored in the memory and executable on the processor, and the processor is configured to implement the steps of the information transmission method according to claim 9 when executing the program.

13. The network device according to claim 12, wherein the processor is configured to implement the following step when executing the program:
sending the QoS identifier to the SMF entity, in a case that a value of the QoS identifier assigned according to the real packet delivery latency over the infrastructure network is a standardized value;
in a case that the value of the QoS identifier assigned according to the real packet delivery latency over the infrastructure network is a non-standardized value, assigning a QoS characteristic, and sending the QoS identifier and the QoS characteristic to the SMF entity;
wherein the QoS characteristic comprises the packet delivery latency budget over the infrastructure network, and in a case that the value of the QoS identifier is the standardized value, the QoS identifier corresponds to the packet delivery latency budget over the infrastructure network.

14. An information transmission method, applied to a base station, comprising:
obtaining, by the base station, QoS control information of a QoS flow sent by a session management function (SMF) entity; and
determining a packet delivery latency over an air interface according to the QoS control information, and performing resource scheduling according to the packet delivery latency over the air interface;
wherein the QoS control information comprises a QoS identifier, a packet delivery latency budget corresponding to the QoS identifier, and a packet delivery latency budget over an infrastructure network corresponding to the QoS identifier; or, the QoS control information comprises a QoS identifier and the packet delivery latency over the air interface corresponding to the QoS identifier.

15. The information transmission method according to claim 14, wherein the QoS control information comprises the QoS identifier, the packet delivery latency budget corresponding to the QoS identifier, and the packet delivery latency budget over the infrastructure network corresponding to the QoS identifier;
wherein the determining the packet delivery latency over the air interface according to the QoS control information comprises: subtracting the packet delivery latency budget over the infrastructure network corresponding to the QoS identifier from the packet delivery latency budget corresponding to the QoS identifier to obtain the packet delivery latency over the air interface.

16. A network device, wherein the network device is a base station and comprises: a transceiver, a memory, a processor, and a program stored in the memory and executable on the processor, and the processor is configured to implement the steps of the information transmission method according to claim 14 when executing the program.

17. The network device according to claim 16, wherein the QoS control information comprises the QoS identifier, the packet delivery latency budget corresponding to the QoS identifier, and the packet delivery latency budget over the infrastructure network corresponding to the QoS identifier;
   wherein the processor is configured to implement the following step when executing the program: subtracting the packet delivery latency budget over the infrastructure network corresponding to the QoS identifier from the packet delivery latency budget corresponding to the QoS identifier to obtain the packet delivery latency over the air interface.

* * * * *